United States Patent [19]

Kiser et al.

[11] Patent Number: 5,290,188
[45] Date of Patent: Mar. 1, 1994

[54] INLET AND DAMPER SYSTEM FOR AIRHOUSES

[75] Inventors: Thomas E. Kiser, Fremont; Norman R. Mowery, II, Tiffin; Thomas G. Schubach, Clyde, all of Ohio

[73] Assignee: Professional Supply, Inc., Fremont, Ohio

[21] Appl. No.: 938,759

[22] Filed: Sep. 1, 1992

Related U.S. Application Data

[63] Continuation-in-part of Ser. No. 732,592, Jul. 19, 1991, Pat. No. 5,146,977.

[51] Int. Cl.⁵ .............................................. F24F 3/06
[52] U.S. Cl. ............................ 454/234; 126/110 AA; 454/236
[58] Field of Search ............ 126/103, 110 AA, 116 R; 454/229, 234, 236, 265, 269, 338, 235

[56] References Cited

U.S. PATENT DOCUMENTS

| | | | |
|---|---|---|---|
| 2,898,836 | 8/1959 | Lockheed | 454/229 |
| 3,212,424 | 10/1965 | Davis | 454/269 X |
| 3,246,643 | 4/1966 | Stark et al. | 454/236 X |
| 3,404,618 | 10/1968 | Jacobs | 454/236 |
| 3,748,997 | 7/1973 | Dean, Jr. et al. | 454/234 |

*Primary Examiner*—Harold Joyce
*Attorney, Agent, or Firm*—Marshall & Melhorn

[57] ABSTRACT

Airhouses for supplying conditioned air in controlled amounts to the interior of large enclosed buildings. An improved air inlet, burner and damper construction adapted for utilization with both newly constructed and existing airhouses is provided. A burner assembly and an outside air inlet are incorporated in a unit adapted to be affixed to the airhouse. A building return air inlet provides communication between the airhouse and the interior of the building. Shear dampers or valves of equal flow capacity varying linearly between open and closed positions are provided in the outside and building return air inlets. The dampers are controllably interconnected to operate in opposition so as to admit a uniform combined volume of outside air and building return air to the airhouse. The burner assembly and outside air and building return air inlets are sized so that air entering the airhouse through the burner unit and the outside and return air inlets are at substantially equal velocities.

17 Claims, 4 Drawing Sheets

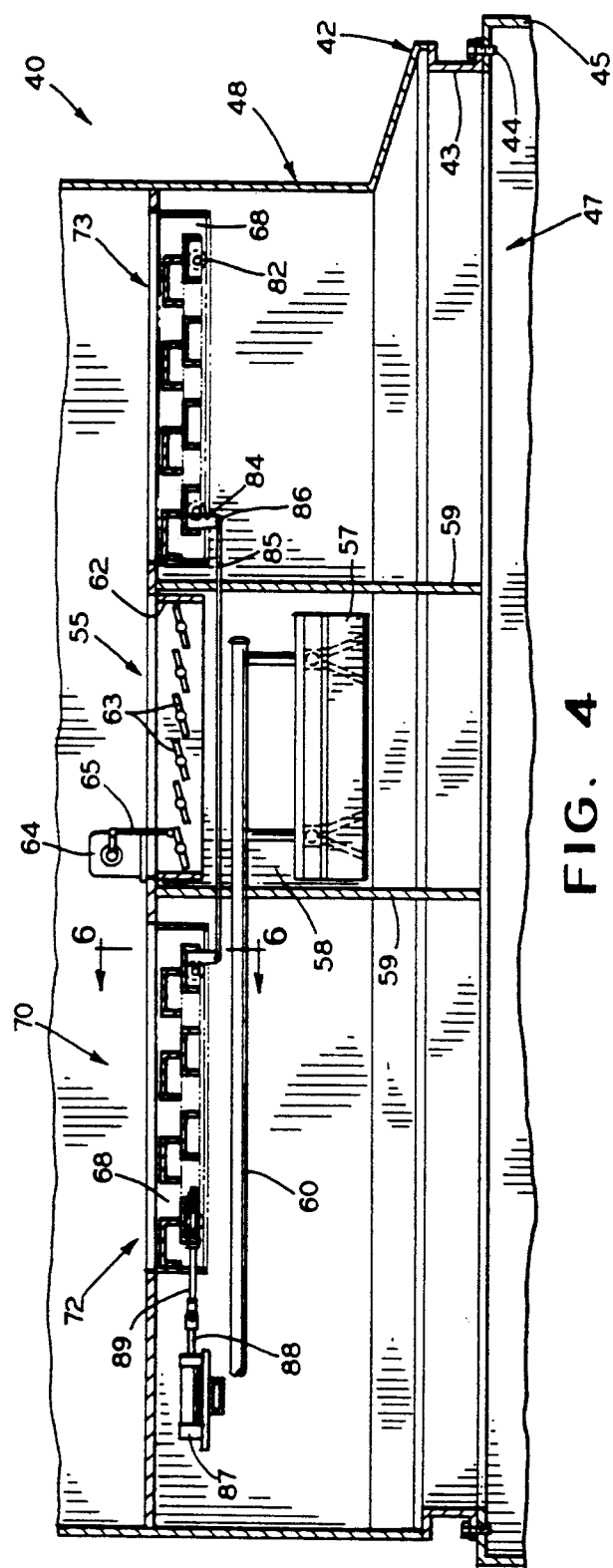
FIG. 4
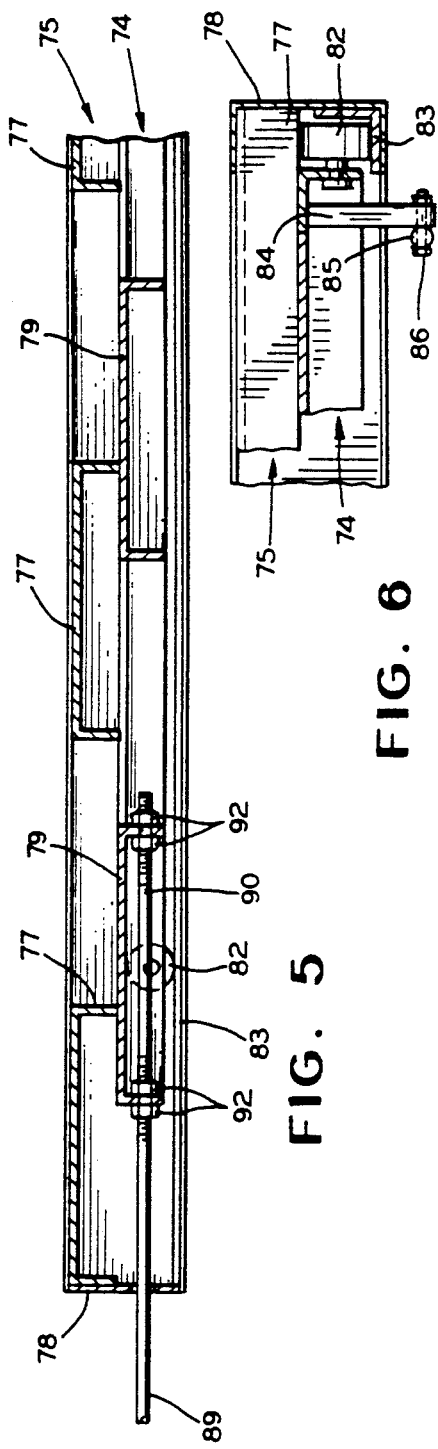
FIG. 5
FIG. 6

INLET AND DAMPER SYSTEM FOR AIRHOUSES

This application is a continuation-in-part of copending application Ser. No. 07/732,592, filed Jul. 19, 1991, now Pat. No. 8,146,977.

BACKGROUND OF THE INVENTION

1. Field of the Invention

The present invention pertains broadly to airhouses for supplying conditioned air to the interior of enclosed structures, and more particularly to an improved inlet, damper and burner construction for such airhouses.

2. Description of The Prior Art

Relatively large industrial-type buildings are commonly provided with so-called airhouses for supplying suitably conditioned air to the interior of the building under controlled conditions so as to maintain atmospheric conditions in the building within prescribed parameters of temperature, humidity and air quality, among others. Such units and their integration into systems for maintaining controlled atmospheric conditions within enclosed structures are disclosed and described, for example, in U.S. Pat. Nos. 4,850,264 and 4,960,041, and the above-identified copending patent applications. The disclosures of those patents and copending applications are incorporated herein by reference.

Such airhouses are generally, although not necessarily, located exteriorly of the buildings, as on the roof or around the perimeter thereof, and may include a cabinet comprised of a framework covered with sheet metal housing a burner and a fan or blower. Optionally, they may also include a heat exchanger for cooling purposes and an evaporator for humidifying purposes. The fan draws fresh air from outside the building, as well as return air from the interior of the building. The burner air inlet, outdoor fresh air inlet and return air inlet are provided with adjustable dampers or valves for regulating air flow through their respective passageways. A portion of the fresh air is drawn over the burner or burners to be heated during the heating season, and the remaining fresh air is mixed with building return air in selected proportions. The heated and unheated air merge downstream from the burner and are discharged into the building to maintain the building interior at a desired temperature and pressure. As described in the aforementioned patents and pending applications, a plurality of individual air houses disposed about the structure may be integrated into a network and centrally controlled in an interrelated manner for regulating atmospheric conditions within the structure.

The airhouses utilized heretofore have conventionally included a hooded opening communicating with the outside atmosphere through which air is drawn for both the outside air and burner air inlets, and an opening communicating with the building interior through which building return air is admitted. Each of the outside air and building return air inlets is provided with a louver-type damper wherein the louver elements are adapted to simultaneously pivot about their longitudinal axes to selected angular positions for regulating air flow through the inlets. The airhouses are designed for the blower to operate at a constant velocity and discharge a constant volume of air to the building interior.

The relevant prior art airhouses further have generally been of a so-called 80/20 profile wherein during burner operation a minimum of 20 percent of the incoming air is outside air which is drawn through the burner. In order to maintain the desired pressure within the building, it is thus necessary to modulate the air being admitted to the airhouse, that is, to properly apportion the incoming outside air and building return air. To that end, the outside air damper and the building return air damper are generally interconnected to operate in opposition, that is, as one of the dampers is opened or closed by a particular amount the other is respectively closed or opened by a corresponding amount. For safety purposes the airhouse is designed so that whenever the burner is operable a predetermined minimum proportion, heretofore 20 percent, of the incoming air is outside air which passes through the burner section, while the remaining 80 percent enters through the outside air and building return air dampers.

Louvered dampers may be of either the so-called parallel blade construction or opposed blade construction. In either construction, the angular setting of the blades of the damper between open and closed positions does not bear a straight line relationship with the flow capacity of the damper. For example, opposed blade dampers at a 45° angular setting have only 20 percent of their fully open flow capacity.

Parallel blade dampers at a 45° angular setting have about 90 percent of their fully open flow capacity. As a consequence, opposed positioning of the outside air and building return air dampers to modulate the proportions of the outside and return air drawn into the airhouse results in undesirable wide variations in air velocity through the airhouse.

The fluctuations in velocity, in turn, adversely affect burner operation. Such burners are designed to operate with incoming air passing thereover at a particular velocity, for example, 3000 feet per minute. Fluctuations in the velocity of the air entering the airhouse through the outside air damper and building return air damper affect the velocity of air across the burner, and may result in formation of dangerous combustion gases or lead to automatic shutdown of the burner. More particularly, if the air velocity across the burner is significantly less than the design velocity, incomplete combustion of the gas may occur and result in carbon monoxide formation. If the air velocity significantly exceeds the design velocity, nitrous oxide may be formed and discharged into the building. In addition, when a relatively large difference in velocity is created within the airhouse between the air passing over the burner and the outside air and building return air, a wind shear problem is created, effectively causing a dead space or barrier between the flowing masses of air. As a result, heat transfer from the relatively hotter burner air to the cooler outside and building return air within the airhouse is impeded, and air masses of different temperatures are discharged into the building. Thus, while the prior art direct-fired space heating units or airhouses represent a significant improvement over earlier systems, they have not proven entirely satisfactory in operation.

SUMMARY OF THE INVENTION

In accordance with the present invention there is provided an improved air inlet, burner and damper construction readily adapted for utilization both with newly constructed airhouses and for retrofitting of existing airhouses. A unit incorporating a burner assembly and an outside air inlet is provided for mounting on the airhouse. The unit includes an enclosed supporting framework carrying one or more burner units with an adjustable damper over the air inlet for the burner or burners.

Interconnected slide dampers are provided at either end of the burner section. An enclosed plenum chamber over the burner section and slide dampers includes inlets in communication with the ambient atmosphere for admitting outside air to the plenum chamber. A building return air inlet in the floor of the airhouse is also provided with an adjustable slide damper. The outside air dampers and building return air dampers are operably interconnected to operate in an opposed manner, and they are sized to be of equal capacity. The air flow capacity of the slide dampers varies linearly in accordance with the positioning of the dampers. Thus, as the interconnected outside air and building return air dampers are adjusted in opposition to modulate the building air supply, their combined flow capacity remains constant. Consequently, the air velocity through the outside and building return air dampers and hence the velocity of the combined flow, remains constant. The burner inlet and outside and return air inlets are sized so that burner air and makeup air velocity are equal. This results in improved burner operation and better homogenization of the heated and unheated air within the airhouse prior to discharge through the building air inlet.

BRIEF DESCRIPTION OF THE DRAWINGS

In the drawings, wherein like numerals refer to like parts throughout:

FIG. 4 is an enlarged fragmentary side elevational view of the outside air inlet and burner section;

FIG. 5 is a fragmentary enlarged side elevation of the control rod portion of the damper of FIG. 4;

FIG. 6 is an enlarged fragmentary view taken substantially along line 6—6 of FIG. 4;

DESCRIPTION OF THE PREFERRED EMBODIMENT

Figure 1:
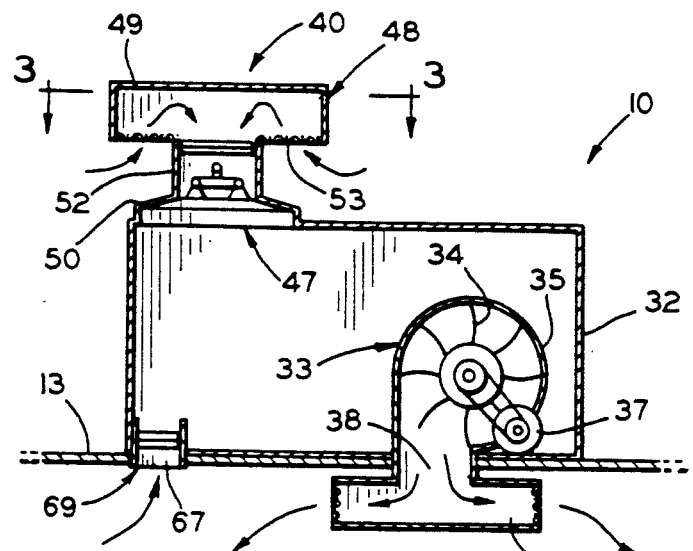
FIG. 1 is a schematic side elevational view of an airhouse embodying a novel burner, inlet and damper or airflow valve system in accordance with the invention.
Figure 2:
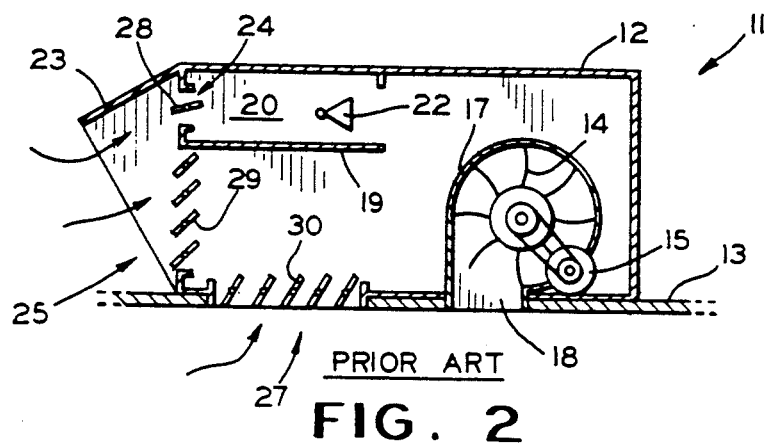
FIG. 2 is a schematic side elevational view, partially in section, of an airhouse embodying a prior art burner, inlet and damper system.

With reference now to the drawings, and in particular to FIGS. 1 and 2, there is shown generally at 10 in FIG. 1 an airhouse embodying the present invention, and at 11 in FIG. 2 an airhouse widely employed heretofore in providing conditioned air to the interior of enclosed structures. The prior art airhouses conventionally include an enclosure 12 disposed as upon a roof 13 of an enclosed building (not shown). A fan 14 driven by a motor 15 and enclosed within a housing 17 is positioned to draw into the air housing and discharge it through an inlet 18 in the roof 13 to the open interior of the building. The fan operates continuously at a constant velocity. Outside air and building return air ar drawn into the housing in selected proportions and, during the heating season a portion of the incoming outside air is drawn over a burner to be heated, so that air is discharged into the building interior at a desired temperature.

To that end, the enclosure 12 is provided with a separator wall 19 which defines with the enclosure 12 a burner section 20 within which a burner assembly 22 is mounted. The airhouse is provided with a hooded inlet 23 through which outside air is drawn to selectively pass through a burner inlet 24 and into the burner section 20, or through an outside air inlet 25 directly into the interior of the airhouse. A return air inlet 27 is provided for selectively admitting building return air. A damper 28 may be provided for closing off the burner inlet 24 at such times as the airhouse is inoperative. At all other times the burner inlet remains open. year. Adjustable louver type dampers 29 and 30 are provided for regulating air flow through the outside air and building return air inlets 25 and 27, respectively. The louvers of the dampers 29 and 30 are interconnected so as to move in an opposed manner as they are adjusted, that is, as one of the louvers is moved to a more open position the other is correspondingly moved to a more closed position.

The airhouses are designed so that during such times as the unit is operable, a fixed proportion of the incoming air must be outside air drawn through the burner section to insure that adequate oxygen would be available for complete combustion of the fuel at the burner at any time the airhouse is operating. For example, the prior art airhouses are conventionally sized and constructed to be of a so-called 80-20 configuration wherein 20 percent of the incoming air is outside air drawn through the 10 burner inlet 24, and the remaining 80 percent is suitably apportioned between the outside air inlet 25 and the return air inlet 27.

Figure 9:
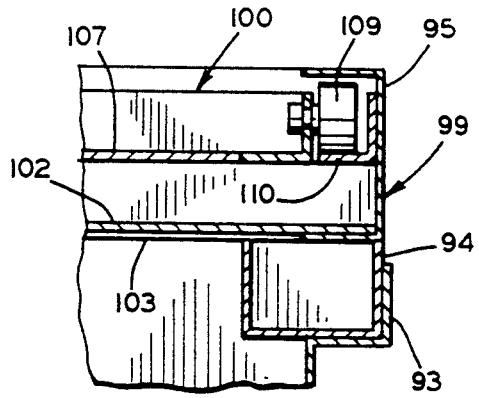
FIG. 9 is an enlarged sectional view taken substantially along line 9—9 of FIG. 8.

The louvered dampers 29 and 30 generally employed heretofore may be of the parallel blade type illustrated in FIG. 9, wherein the individual blades of the damper pivot in the same direction about their longitudinal axes in unison, and remain generally parallel to one another. Alternatively, the dampers may be of the conventional opposed blade type (not shown) wherein alternate ones of the individual blades pivot in opposite directions between the fully open and fully closed positions. In either type, the open area of the damper available for air flow, and hence the flow capacity, does not vary linearly with the angular setting of the damper blades.

The dampers 29 and 30 are interconnected for equal and opposite movement for modulating the proportion of outside and building return air. The effective combined open area or flow capacity of the two dampers thus does not remain constant, and consequently the velocity of the air being admitted through the dampers 29 and 30 as well as through the burner section 20, may undesirably fluctuate. These velocity fluctuations may adversely affect combustion at the burner assembly 22, resulting in dangerous formation of carbon monoxide or nitrous oxide gases. In addition, differences in velocity between the heated air from the burner section 20 and the unheated air from the inlets 25 and 27 create flow conditions within the airhouse which discourage heat transfer from the heated to the unheated air and result in admission of air to the building having undesirable temperature gradients.

The present invention overcomes the aforementioned deficiencies of the prior art devices by providing an air inlet, burner and damper or air valve system readily adapted for integration into newly constructed airhouses, as well as for retrofitting of existing airhouses, wherein the combined open area or flow capacity of the outside air and building return air inlets remains constant at all settings of the valve system, and thus the air velocity remains uniform. The system is also sized and constructed so that the velocity of air through the burner section and incoming air from the outside and return air inlets is substantially equal, whereby heat transfer from the heated air to the incoming outside and building return air is facilitated. The airhouse 10 of the invention, as shown schematically in FIG. 1, includes an enclosure 32 positioned as upon the roof 13 of a building. While the airhouse for descriptive purposes has been illustrated and will be described as being located on the roof 13, it will be understood that such airhouses may be placed in other locations such as on the ground along side the building, or even within the building, with duct work suitably connecting the airhouse inlets and outlets to the building interior and exterior.

There is located within the airhouse a blower 33 including an impeller 34 journaled for rotation in the usual manner within a housing 35 and conventionally driven by a motor 37. Air drawn into the fan housing 35 is directed through an inlet 38 in the roof 13 and discharged into the building interior as through a directional diffuser 39.

A burner and outside air inlet unit, identified generally at 40 and readily adaptable to either incorporation into newly constructed airhouses or in-place retrofitting of existing airhouses, is mounted upon the enclosure. In the embodiment illustrated the unit is generally T-shaped in transverse section as illustrated in FIG. 1. However as will be hereinafter described the unit may assume other and different configurations where desirable for different airhouse constructions and locations. In any event, the unit 40 includes a circumferential base framework 42 formed of suitable structural elements, such as channel shaped members 43, by which the unit may be secured as by bolts 44 to structural members 45 surrounding an opening 47 in the airhouse enclosure 32. As will be appreciated, an existing airhouse may thus be readily modified to accommodate the mounting of the burner and air intake unit, and the unit may likewise be modified for mounting in different positions on existing airhouses.

Figure 3:
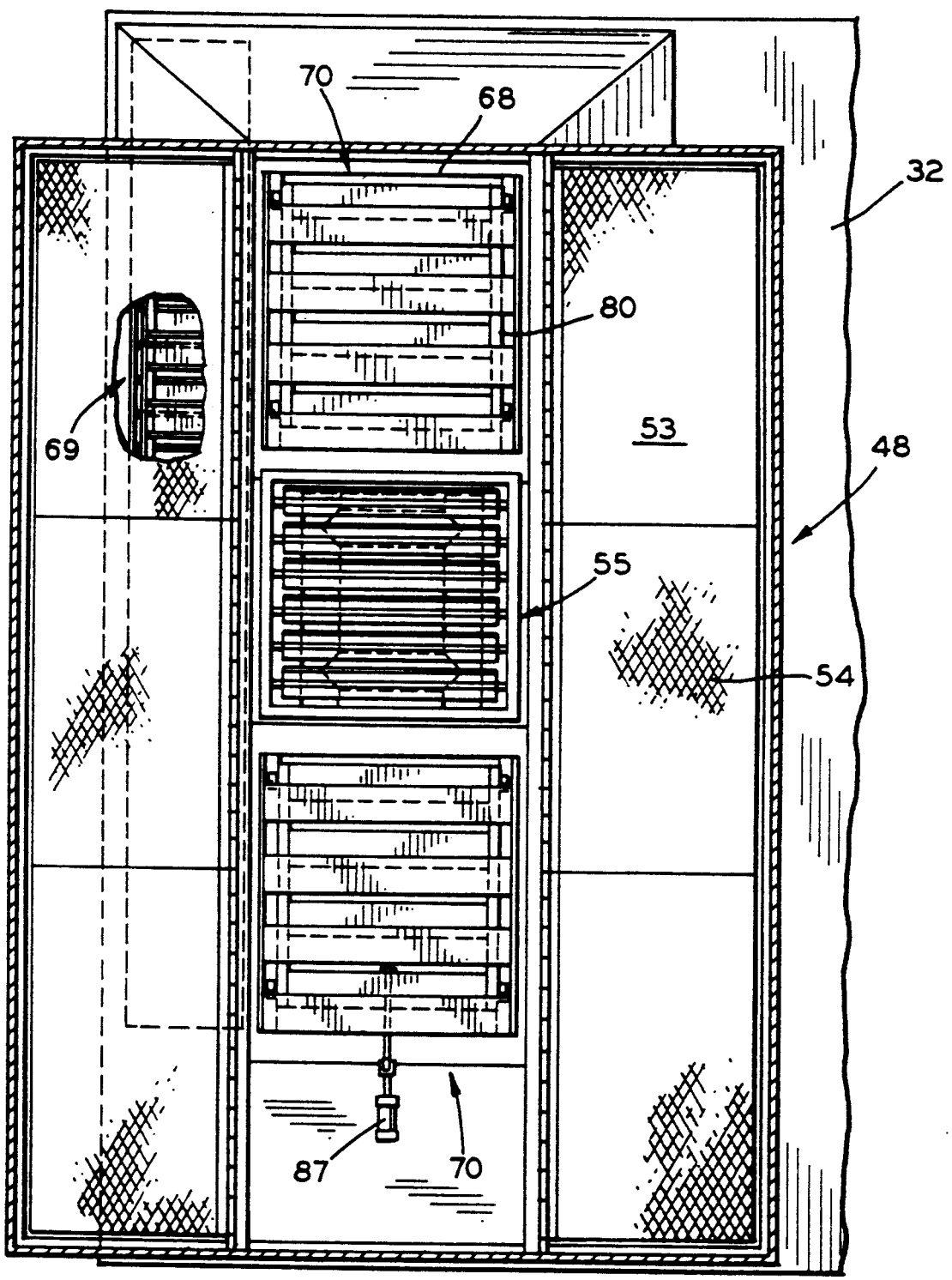
FIG. 3 is an enlarged fragmentary plan view, with parts broken away, taken substantially along line 3—3 of FIG. 1.

The burner and air intake unit 40 in a preferred form, as illustrated in FIGS. 1, 3 and 4, comprises an elongated housing enclosure 48 having a generally T-shaped cross-section, and includes an extended top chamber 49 interconnected with a base or coupling section 50 by a throat section 52. The top chamber 49 extends laterally beyond the throat section, and elongated inlet openings 53 are provided in the lower extended portion along either side for admitting outside air. Screens 54 may be provided over the inlet openings to prevent debris and animals from entering the enclosure. Ambient outside air is thus selectively drawn in through the openings 5 and into the airhouse as will be hereinafter described.

In order to provide heated air for the building, there is provided within the throat section 52 a burner assembly 55. More particularly, a conventional burner unit 57 is suitably mounted within a chamber 58 defined by walls 59 extending transversely between the opposite side walls of the intake unit 40. A gas line 60 supplies gas in a suitably controlled manner to the burner unit. A damper 62 is provided above the burner unit, at the entrance to the chamber 58, for closing off the chamber during those periods when the air handling unit is inoperative, such as during the non-heating period of the year. For purposes of safety the damper 62 must, of course, be fully open at all times during which the air handling unit is operable, and particularly when the burner unit is operable, as during the heating season. To that end, the damper may suitably be of the conventional parallel louver type having individual vanes 63 mounted for pivoting movement about their longitudinal axes. The individual vanes are interconnected for simultaneous pivoting movement, and the vanes are operatively connected to a drive unit 64 by linkage means 65 for movement between vertical, fully opened positions and substantially horizontal fully closed positions. The drive unit, in turn, is connected to a central control unit or computer as will be hereinafter described, which is programmed to coordinate operation of the burner unit in conjunction with other parameters of the building air supply system and to assure that the damper 62 is appropriately positioned in accordance with the operational mode of the air handling unit and burner unit 57.

As outlined in the aforementioned patents and copending applications, outside air and building return air are drawn into the airhouse in selected proportions for maintaining the building atmosphere within predetermined desired parameters. In accordance with the invention building return air is admitted to the airhouse through a return air inlet 67, while outside air is drawn into the burner and air intake unit 40 and admitted to the airhouse interior through the throat section 52 by means of outside air inlets 68 at either end of the burner assembly 55. The return air inlet and outside air inlets are provided with slide valves or dampers, identified generally at 69 and 70, respectively, which are operatively interconnected as will be hereinafter described so as to admit a combined air flow of constant volume at a uniform velocity.

In order to overcome the above-noted deficiencies inherent in prior art pivoted louver type dampers, the dampers 69 and 70 are of the shear or slide valve type wherein the air flow capacity of the damper varies as a straight line function between the fully open and fully closed positions. Thus, by properly sizing the dampers 69 and 70 and operating them in opposed fashion, the combined flow of outside air and building return air admitted to the airhouse will remain constant as the proportion of outside air and building return air is selectively adjusted to meet changing operating demands.

As best seen in FIGS. 3 and 4, the damper 70 is formed in first and second sections 72 and 73 located at opposite ends of the burner assembly 55. The damper sections are of similar construction and are interconnected for simultaneous operation as will be hereinafter described. As viewed in FIG. 4, the incoming outside air travels downwardly through the damper. In order to facilitate operation under the pressure applied by the incoming air, the damper sections 72 and 73 preferably comprise a reciprocally slidable lower leaf 74 disposed beneath a fixed upper leaf 75. The upper leaf is formed by a plurality of spaced elements 77 in the form of inverted channel-shaped sections affixed in spaced parallel relation within a surrounding framework 78 suitably mounted at the entrance to the throat section 52. The lower leaf 74 likewise comprises a plurality of spaced elements 79 of inverted channel shape interconnected at their opposite ends as by structural angle members 80. Wheels 82 affixed to the vertical legs of the angle members at the corners of the lower leaf unit rollingly ride on tracks 83 carried by the framework 78 and extending along each side of the framework.

The channel-shaped elements of the lower and upper leafs 74 and 75 are positioned so that the width of the spaces therebetween is about the same as or slightly less than the width of the channel-shaped element. For example, the elements 77 and 79 may be structural channels having a nominal width on the order of six inches, and the spacing between the elements is likewise about six inches or slightly less. Thus, when the elements 77 and 79 are vertically aligned with the damper in the fully open position, the spaces between the elements of the upper and lower leaf will provide the maximum area for passage of air. When the lower leaf is in the closed position, with the elements 77 and 79 offset from each other, the spaces between elements will be completely closed off.

The first and second damper sections 72 and 73 are preferably interconnected for simultaneous operation by a single drive unit. To that end, brackets 84 are affixed to the lower leaf 74 of the sections 72 and 73, preferably at each side edge. Rods 85 are connected between the corresponding brackets on each of the sections and extending beneath the damper 62 of the burner unit 55. Thus, as the damper section 72 is caused to move laterally to selected positions, the section 73 follows and is similarly positioned relative to its associated fixed upper leaf 75.

Controlled movement of the lower leafs 74 to selected positions is accomplished by means of a linear actuator 87 suitably mounted for coupling to the adjacent moveable leaf. The linear actuator, by way of example, may be an air cylinder having a piston rod 88 coupled to a control rod 89. The control rod extends through the frame-work 78 and is connected to the end one of the elements 79 of the lower leaf 74. In order to provide for correct positioning of the leafs relative to the linear actuator, the control rod includes a threaded portion 90 at its distal end which extends through the opposite side flanges of the channel-shaped element 79. Pairs of threaded nuts 92 are positioned on either side of the flanges. Thus, by manipulating the nuts 92 the position of the leafs 74 may be adjusted within limits relative to the stroke of the piston rod.

The damper 69 in the return air inlet 6 is similar in construction to the damper 70 in the outside air inlet 68. The damper is, however, inverted with respect to the damper 70 since the air being drawn therethrough into the airhouse is traveling in the opposite direction. Thus, the stationary leaf of the shear damper is disposed beneath the travelling leaf so as to face the incoming flow of air from the building interior.

Figure 7:
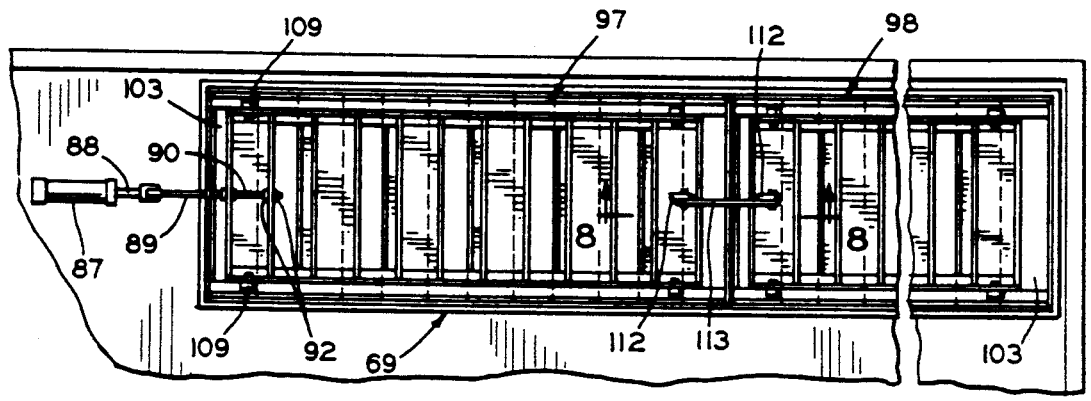
FIG. 7 is a top plan view of the building return air damper.
Figure 8:
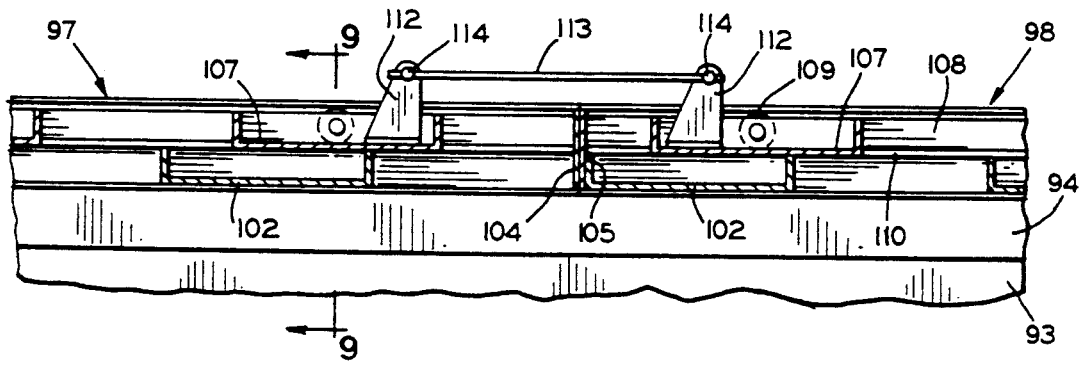
FIG. 8 is an enlarged vertical section taken substantially along line 8—8 of FIG. 7.

More particularly, as best seen in FIGS. 7, 8 and 9, the damper 69 is constructed for mounting within a channel of a frame member 93 surrounding the return air inlet 67. The damper is supported upon a peripheral base member 94 such as a channel section, which rests upon the frame member 93. A longitudinal edge channel section 95 extends along either side of the assembly. Although the damper may be constructed as a single operating section, in order to facilitate construction and installation it is preferably formed in first and second sections 97 and 98 interconnected for simultaneous operation as shown in FIGS. 7 and 8. Each section includes a lower fixed leaf 99 over which an upper leaf 100 is mounted for reciprocating sliding movement.

Each fixed lower leaf comprises a plurality of spaced, transversely extending channel sections 102 affixed at their opposite ends to the base member 94. The channel sections 102 at the outer ends of the first and second sections 97 and 98 are spaced from the adjacent end section of the base 94 by a distance sufficient to permit movement of the upper sliding leaf 100 between fully open and fully closed positions as will be described. Closure plates 103 are provided at either end for blocking off the space between the end channel section and the adjacent base section. The damper sections 97 and 98 are provided with end walls 104 and 105, respectively, which abut one another with the damper sections assembled as shown in FIG. 8.

The upper sliding leaf 100 of each damper section includes a plurality of spaced, transversely extending channel sections 107 affixed at their opposite ends to longitudinally extending frame members 109, which may be in the form of structural angles. Rollers 109 affixed to the vertical legs of the frame members rollingly ride on side rails 110 affixed to the edge channels 95. The rollers are positioned so that the upper leaf 100 may be readily moved back and forth on the rollers with the base of the channel sections 107 closely adjacent the tops of the channel sections 102. As with the damper 70 in the outside air inlet, the channel sections 102 and 107 of the fixed and sliding leafs are sized and spaced so that the sections 107 will completely cover the spaces between adjacent sections 102 of the fixed leaf portion when the upper sliding leaf sections are moved to the closed position. Likewise, the channel sections 107 will be substantially superimposed above the sections 102 so that the gaps between the adjacent sections 102 are substantially unobstructed when the upper sliding leafs are in the fully open position. As will be apparent in FIGS. 9, the rollers 109 are disposed beneath the inturned flange of the edge channel 95 so as to confine the sliding leafs 100 to movement along a longitudinal path and insure that they will not be raised upwardly by the incoming building return air.

For convenience in fabrication and installation, the damper 69 may be constructed as separate first and second sections 97 and 98. However, the sections are preferably interconnected for operation in conjunction with the damper 70. Thus, as shown in FIGS. 7 and 8, there is affixed to the channel sections 107 at the adjacent ends of the first and second damper sections 97 and 98 a pair of upstanding brackets 112. The brackets are interconnected by a tie rod 113 so that the two sections of the upper sliding leaf 100 will move back and forth in unison between open and closed positions of the damper. The tie rod may be affixed to the brackets by suitable adjusting fasteners or clamps 114 which permit selective setting of the distance between the two sections to assure corresponding positioning of the two upper sliding leaf sections 100 relative to the two lower fixed leaf sections 99.

Coordinated movement of the upper sliding leaf 100 of the return air inlet 67 with the sliding leaf 74 of the outside air inlet 68 is provided by a second one of the linear actuators 87, whose piston rod 88 is coupled to a central rod 89 affixed to the end one of the channel section 107. As with the sliding leaf 74, the control rod 89 includes a threaded portion 90 and nuts 91 for adjustably connecting the linear actuator to the sliding leaf 100.

As indicated heretofore, prior art airhouses have conventionally employed parallel blade or opposed blade dampers for regulating air flow through the outside air and return air inlets. The burners of such units are generally of the so-called 80-20 configuration, that is, the units are designed and the inlets are sized so that twenty percent of the incoming air must pass through the burner section at any time the airhouse is operable, and the remaining eighty percent of the incoming air enters the airhouse directly for integration with the air from the burner section and admission to the building interior. It has been found with such airhouses that there is a tendency for large differences in velocity to be created between the heated air from the burner section and the combined flow of outside air and building return air as described above. In addition, in order to provide sufficient heat to maintain the building interior at the desired level during periods of cold weather in view of the fluctuating air velocities within the airhouse, it is necessary to heat the air in the burner section to relatively high temperatures. By way of example, in a conventional airhouse of the 80-20 configuration designed for an air velocity over the burner of 3000 feet per minute, it may be necessary to heat the air in the burner section to a temperature on the order of 430° F. (222° C.). At the same time, due to the varying air capacity at different louver positions, the incoming unheated air may be at a velocity, for example, of only 1200 feet per minute. This large difference in velocity between the merging heated and unheated air creates a wind shear condition which is not conducive to heat transfer from the hotter to the colder air. As a result, air currents of widely differing temperatures may be directed into the building from the airhouse.

In the airhouse of the present invention the building return air and outside air dampers 69 and 70, respectively, are of equal size or capacity, that is, they are sized to provide equal air flow at equivalent settings. With the shear or slide valve damper construction, the flow through the dampers varies linearly between the fully open and fully closed positions. The return air and outside air dampers are operably interconnected for opposed operation to thus maintain a constant combined flow of return air and outside air to the airhouse at a uniform velocity. The dampers are sized so that the velocity of the entering combined outside and return air is substantially equal to the velocity of the air through the burner section. For example, if the burner section is designed for a velocity of 3000 feet per minute, the return air and outside air dampers are likewise designed for a combined air flow at a velocity of 3000 feet per minute. The heated and unheated air thereby travel at the same velocity through the airhouse, facilitating heat transfer and equalization of the temperature of the air before it is discharged into the building interior.

Due to the uniform air velocity and improved heat transfer within the airhouse, the burner and air intake unit 40 may be constructed for admission of a greater proportion of the incoming air passing through the burner section, for example with a 70-30 profile instead of the normal 80-20 profile heretofore described. Thus, in a preferred construction the unit is designed so that thirty percent of the incoming air passes through the burner section at all times during operation of the airhouse. Due to the increased volume of air available t absorb and carry heat, the temperature to which the air must be heated can be substantially reduced. Thus, while maintaining the same velocity of 3000 fee per minute, it is possible to reduce the air temperature from 430° F. as heretofore described for an 80-20 burner profile, to a maximum temperature on the order of 300° (150° C.). The reduced temperature significantly improves the operating life of belts, bearings, lubricants and other maintenance items.

Figure 10:
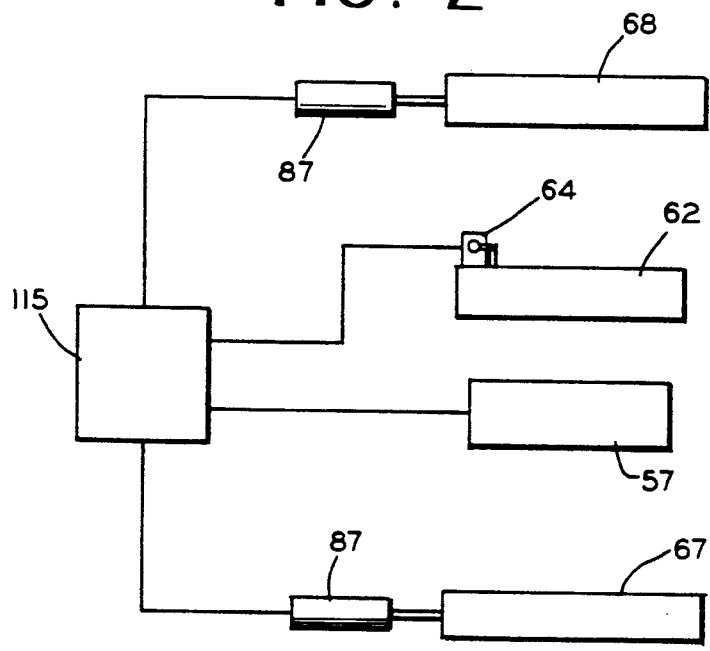
FIG. 10 is a schematic view of a control system for the burner unit and dampers.

In operation, as described in the aforementioned U.S. Pat. Nos. 4,850,264 and 4,960,041, data from various sensors located throughout the building is transmitted to a central processing unit or computer. The computer compares the observed data to predetermined desired parameters, and initiates corrective measures by sending appropriate signals to the various system components where observed conditions or trends fall outside the desired parameters. There is shown schematically in FIG. 10 a system for controlling the burner unit, outside air inlet and return air inlet of an airhouse in accordance with the invention. Thus, data from various sensors (not shown) is transmitted to a central computer 115. The computer is operably connected to the burner assembly and outside air and return air dampers of each of a plurality of airhouses. In response to observed temperature and pressure conditions, the computer 115 sends signals to the appropriate airhouse or airhouses to correct temperatures or pressure tending to fall outside prescribed parameters. For example, if additional heat is required from an airhouse, the computer will insure that the damper 62 is disposed in the fully open position by the drive unit 64, and then initiate operation of the burner 57. Likewise, if correction of the atmospheric pressure is required, the computer will cause the linear actuators 87 to simultaneously move the dampers 69 and 70 in the building return air inlet and outside air inlet 67 and 68, respectively, in opposite directions to modulate the proportions of outside air and building return air and thus appropriately vary the volume of outside makeup air admitted through the airhouse. Since the two dampers are of equal flow capacity and their flow varies as a linear function between their fully open and fully closed positions, the combined volume of the outside and building return air entering the airhouse, as well as the air velocity, remain constant.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. In apparatus for supplying air to the interior of a building, an enclosure, a first inlet to the enclosure in communication with the outside atmosphere for admitting outside air to the enclosure, a second inlet to the enclosure in communication with the interior of the building for admitting building return air to the enclosure, fan means operable to draw air into said enclosure through said first and second inlets and direct the air drawn into the enclosure into the interior of the building, and shear damper means adjustably coordinating the flow of air through said first and second inlets to admit a substantially constant volume of combined outside air and building return air to said enclosure in selected proportions.

2. Apparatus for supplying air to the interior of a building as claimed in claim 1, wherein the shear damper means adjustably coordinating the flow of air comprises first and second shear dampers in said first and second inlets, respectively, said first and second shear dampers being adjustable between fully open and fully closed positions and providing a substantially linear variation in air flow capacity therethrough from the fully open to the fully closed position.

3. Apparatus for supplying air to the interior of a building as claimed in claim 1, wherein the first and second inlets and the shear damper means adjustably coordinating the flow of air therethrough are of substantially equal air flow capacity.

4. Apparatus for supplying air to the interior of a building as claimed in claim 2, including means for selectively adjusting said first and second dampers in opposed directions in response to a signal indicative of an observed atmospheric pressure condition within said building interior.

5. In apparatus for supplying air to the interior of a building, an enclosure, a first inlet to the enclosure in communication with the outside atmosphere for admitting outside air to the enclosure, a second inlet to the enclosure in communication with the interior of the building for admitting building return air to the enclosure, fan means operable to draw air into said enclosure through said first and second inlets and direct the air drawn into the enclosure into the interior of the building, and means adjustably coordinating the flow of air through said first and second inlets to admit a substantially constant volume of combined outside air and building return air to said enclosure in selected proportions, wherein the means adjustably coordinating the flow of air comprises first and second dampers in said first and second inlets, respectively, said first and second dampers being adjustable between fully open and fully closed positions and providing a substantially linear variation in air flow capacity therethrough from the fully open to the fully closed position, said first and second dampers comprising shear dampers, and said first and second shear dampers being of substantially equal air flow capacity.

6. Apparatus for supplying air to the interior of a building as claimed in claim 5, wherein each of said first and second dampers includes a stationary first leaf and a second leaf moveable relative to said first leaf for varying air flow through said first and second inlets between fully closed and fully open positions.

7. Apparatus for supplying air to the interior of a building as claimed in claim 6, wherein said first leaf comprises a plurality of spaced first elements extending transversely of said inlet and said second leaf comprises a plurality of spaced second elements extending parallel to said first elements, said second elements being interconnected for simultaneous movement relative to said first elements.

8. An apparatus for supplying air to the interior of a building, an enclosure, a first inlet to the enclosure in communication with the outside atmosphere for admitting outside air to the enclosure, a second inlet to the enclosure in communicating with the interior of the building for admitting building return air to the enclosure, fan means operable to draw air into said enclosure through said first and second inlets and direct the air drawn into the enclosure into the interior of the building, and means adjustably coordinating the flow of air through said first and second inlets to admit a substantially constant volume of combined outside air and building return air of said enclosure in selected proportions, including an intake unit in communication with said enclosure through which ambient outside air is drawn into said enclosure, a chamber in said intake unit having an inlet, a burner assembly within the chamber for selectively heating ambient outside air drawn through the chamber, and damper means within the chamber inlet for selectively closing off said chamber against passage of outside air.

9. Apparatus for supplying air to the interior of a building as claimed in claim 8, wherein said first and second inlets and said chamber inlet are of such dimensions that air is drawn into said enclosure by said fan means through said chamber and said first and second inlets at substantially equal velocity.

10. Apparatus for supplying air to the interior of a building as claimed in claim 8, wherein the chamber inlet and said first and second inlets are sized so that with said chamber damper means fully open about thirty percent of the air drawn into said enclosure in drawn through said chamber and the remainder is drawn through said first and second inlets.

11. An apparatus for supplying air to the interior of a building comprising, an enclosure adjacent the building, an air intake unit on said enclosure for admitting ambient outside air to said enclosure, a first inlet in said air intake unit for admitting ambient outside air to said enclosure, a second inlet to said enclosure in communication with the interior of the building for admitting building return air to the enclosure, a burner chamber in said air intake unit for receiving ambient outside air and admitting the air to said enclosure, fan means operable to draw air into said enclosure through said first and second inlets and said burner chamber and direct the air drawn into the enclosure into the interior of the building, and means adjustably coordinating the flow of air through said first and second inlets and said burner chamber to admit a substantially constant volume of combined outside air and building return air to said enclosure in selected proportions.

12. Apparatus for supplying air to the interior of a building as claimed in claim 11, including a first slide damper in said first inlet and a second slide damper in said second inlet, said first and second slide dampers being operably interconnected for opposed regulation of air flow through said first and second inlets for admitting said substantially constant volume of combined outside air and building air.

13. Apparatus for supplying air to the interior of a building as claimed in claim 12, wherein said air intake unit comprises an elongated throat section, said burner chamber and said first inlet being associated with said throat section.

14. Apparatus for supplying air to the interior of a building as claimed in claim 13, wherein said first inlet comprises spaced first and second sections disposed at opposite ends of said burner chamber.

15. Apparatus for supplying air to the interior of a building as claimed in claim 14, wherein said first slide damper includes first and second sections for controlling air flow through said first and second sections, respectively, of said first inlet, and means interconnecting said first and second slide damper sections for adjustment in unison.

16. Apparatus for supplying air to the interior of a building as claimed in claim 13, including inlet chamber means disposed over said elongated throat section and extending laterally beyond either side of said throat section, and an inlet opening extending along either side of said throat section in the extended lower wall of said inlet chamber means.

17. Apparatus for supplying air to the interior of a building as claimed in claim 11, wherein the air flow capacity of said burner chamber is about thirty percent of the air admitted to the enclosure and the combined air flow capacity of said first and second inlets is about seventy percent of the air admitted to the enclosure.

* * * * *